Aug. 23, 1932.  F. REGERO  1,872,812
WATCH CLEANING MACHINE
Filed July 11, 1930  2 Sheets-Sheet 1
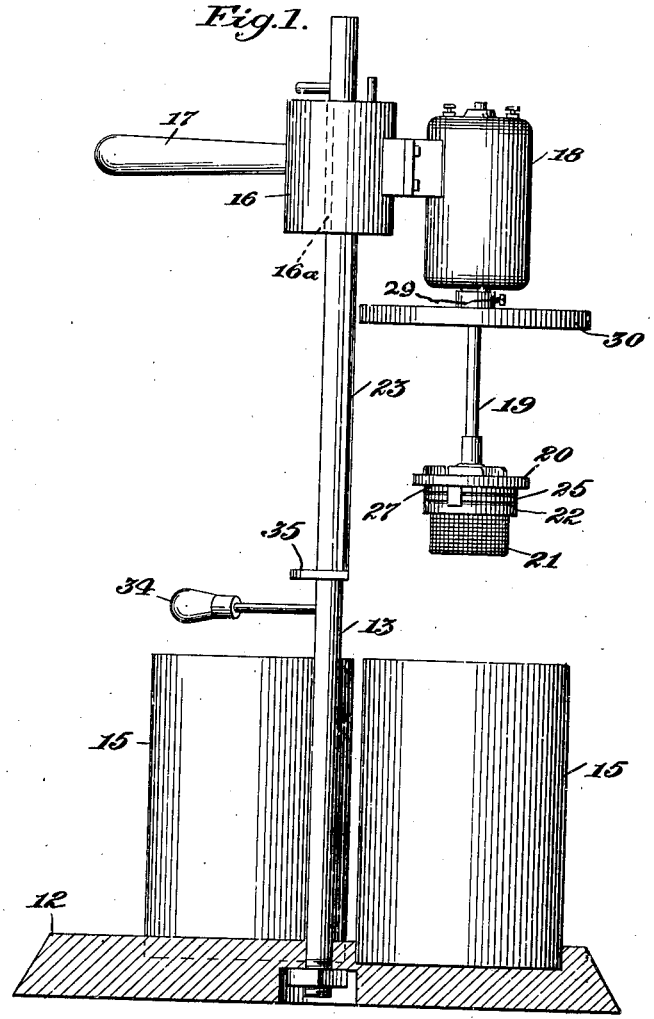
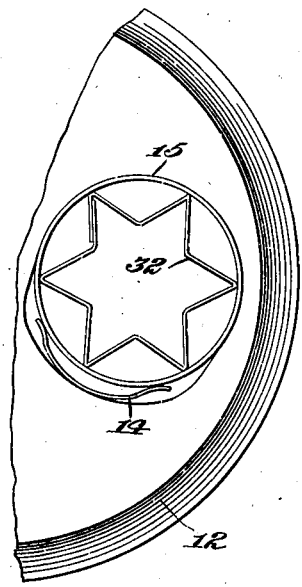
Inventor:
Frank Regero,
by Calvin Calvin,
Att'ys.

Aug. 23, 1932.   F. REGERO   1,872,812
WATCH CLEANING MACHINE
Filed July 11, 1930   2 Sheets-Sheet 2
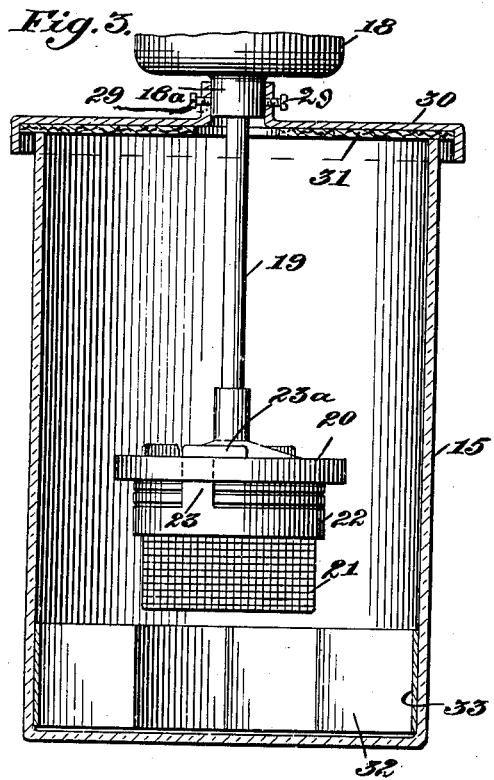
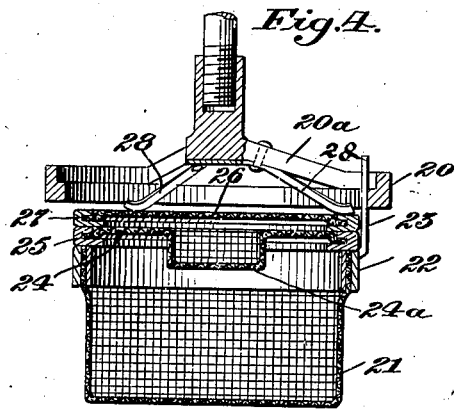
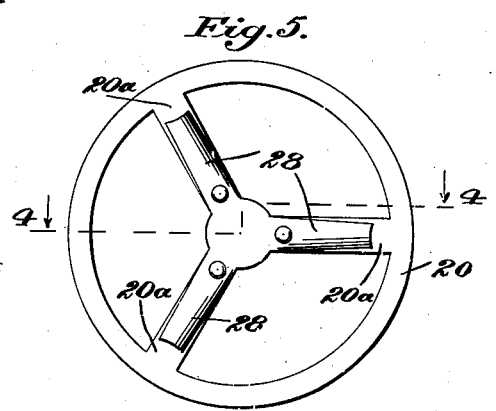
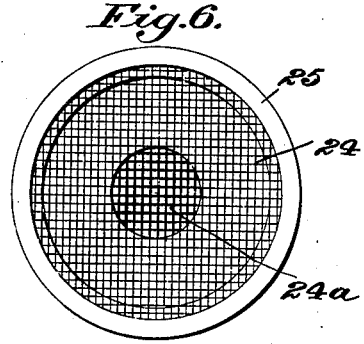
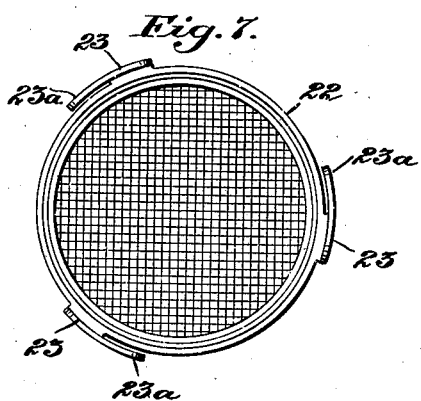
Inventor:
Frank Regero Patented Aug. 23, 1932

1,872,812

UNITED STATES PATENT OFFICE

FRANK REGERO, OF MACON, GEORGIA, ASSIGNOR TO L. & R. MANUFACTURING COMPANY, A CORPORATION OF NEW JERSEY

WATCH CLEANING MACHINE

Application filed July 11, 1930. Serial No. 467,374.

This invention relates to a watch cleaning machine of the class shown in my application Serial No. 383,748, filed Aug. 5, 1929, and comprises certain improvements on the machine shown in said application.

In the accompanying drawings Fig. 1 is an elevation, with the base in section, of a machine embodying the present improvements. Fig. 2 is a partial plan view of the base of the machine showing one of the jars or tanks for holding a cleansing solution with a breaker device therein. Fig. 3 is a sectional view on a somewhat larger scale of a solution-holding jar or tank with the parts-cleansing basket therein. Fig. 4 is a diametric section of the cleansing basket and its carrier, the section of the carrier being on line 4—4, Fig. 5. Fig. 5 is a bottom view of the basket holder. Fig. 6 is a detail view of one of the basket members and Fig. 7 is a plan view of the main basket showing its rim and certain parts carried thereby.

Referring to the drawings, 12 denotes a suitable base to which is fixed a standard 13 to which is attached a spline 23 for vertically guiding a carrier 16 for an electric motor 18, the carrier being provided with a handle 17 by which it may be turned to bring any one of several vertical grooves 16ª in said carrier into register with the spline 23, as fully set forth in my said application in which these parts are designated by similar reference numerals.

Fitting in the base 12 are jars or tanks 15 for holding the cleansing solutions, said jars or tanks being herein shown as being of circular form instead of being rectangular as in my said application. These jars or tanks are intended to fit somewhat loosely in the recesses of said base, and may be held in place by suitable springs, as 14, arranged in the recesses of the base.

To the lower end of the shaft 19 of the electric motor is fixed a holder 20 with which is connected a main wire mesh basket 21 having at its top a rim 22 provided with upwardly projecting arms 23 having horizontal parts 23ª adapted to engage radial arms 20ª of the holder 20 when said rim 22 is fitted to said holder and is given a partial rotation; these connections being in the nature of a bayonet joint.

Fitted to the top of the basket and resting on the rim thereof is a wire mesh member 24 having a sheet metal rim 25, said member 24 having a central circular depression 24ª affording a chamber adapted to receive a balance wheel and hair spring of a watch for a cleaning operation. Supported by the rim of the member 24 is a wire mesh cover member 26 having a sheet metal rim 27 resting on the rim 25 of the member 24, the said parts 24 and 26 being spaced apart by their rims so as to afford a small chamber between them.

To the radial arms 20ª of the holder 20 are attached plate springs 28 bearing upon the rim of the cover member 26 so as to hold said member in place against the rim of the member 24.

To the hub 18ª of the electric motor is suitably attached, as by one or more screws 29, a cover 30 which, when the parts are lowered so that the basket 21 and the parts connected therewith are brought down into the jar or tank 15 the said cover will rest on top of the jar or tank and thus prevent the escape of fumes or splashing of the cleansing solutions, when the basket holding the parts to be cleansed is in rapid rotation in said jar or tank. The cover 30 is preferably provided with a lining 31 of cork or other suitable material.

At the bottom of each of the jars or tanks holding the cleansing solution is preferably located a breaker 32 of any suitable form which will tend to assist in breaking up sediment in the solution when the cleansing basket is rotated in the jar or tank. This breaker, as herein shown, is of star formation but may be of any other suitable form.

In the operation of this watch cleaning machine the parts to be cleansed will be placed in the wire mesh basket 21 and the wire mesh member 24, and the said basket will then be attached to the holder 20 mounted on the motor shaft 19 and will be secured to said holder by a partial rotation of the basket 21, as hereinbefore explained. The carrier 16 will then be partially turned to bring one of the vertical slots 16ª in said carrier into register with the spline 23, and said carrier and the parts connected therewith, including the motor 18, will be lowered to insert the basket 21 and attached parts into a tank or jar 15 holding a cleansing solution. It will be understood that several, preferably three, of these jars or tanks, with solutions of different kinds, will be provided, and by turning the carrier 16 by its handle 17 the basket may be lowered into any one of these jars or tanks. After the cleansing operation the carrier 16 may be turned to bring the basket 21 and parts connected therewith above an electric light bulb 34, for drying, as in the construction shown by my application hereinbefore referred to. In lowering the basket into a tank or jar the downward movement of the said basket and the parts by which it is connected may be arrested by a stop 35 fixed to the standard 13.

Having thus described my invention I claim and desire to secure by Letters Patent:

1. In a watch cleaning machine, the combination with a depending rotatable shaft, of a holder attached to the lower end of said shaft and comprising radial arms provided with springs, and a wire mesh basket having a rim to contact with said springs and provided with locking means to co-operate with said arms, whereby it may be attached to or detached from said holder.

2. In a watch cleaning machine, the combination with a depending rotatable shaft, of a holder attached to the lower end of said shaft and comprising radial arms provided with springs, a wire mesh cover having a rim to contact with said springs, a wire mesh basket provided with locking means to co-operate with said arms, whereby said basket may be attached to or detached from said holder, and a wire mesh member having a rim resting on the rim of said basket and having a central depressed part adapted to hold certain watch parts.

In testimony whereof I affix my signature.

FRANK REGERO.